May 22, 1934.   C. C. GUTHRIE   1,959,915
LENSLESS SPECTACLES
Filed Sept. 22, 1932   2 Sheets-Sheet 1

INVENTOR
Charles C. Guthrie
By Green & McCallister
His Attorneys

May 22, 1934.  C. C. GUTHRIE  1,959,915
LENSLESS SPECTACLES
Filed Sept. 22, 1932   2 Sheets-Sheet 2

INVENTOR
Charles C. Guthrie
By Green & McCallister
His Attorneys

Patented May 22, 1934

1,959,915

UNITED STATES PATENT OFFICE 1,959,915

LENSLESS SPECTACLES

Charles C. Guthrie, Pittsburgh, Pa.

Application September 22, 1932, Serial No. 634,356

8 Claims. (Cl. 88—41)

This invention relates to spectacles and more particularly to lensless spectacles.

One object of this invention is to provide a lensless spectacle which will increase the depth of sharp focus and permit the object being viewed to be moved forward or backward from the focal plane without blurring or imperfect focusing.

Another object of this invention is to provide a lensless spectacle which will reduce spherical aberrations and other objectionable factors in the eye refracting mechanisms or media.

A further object of this invention is to provide a lensless spectacle which will reduce the activity of the focusing mechanism of the eye, prevent over stimulation of the retina and at the same time permit sharp, clear vision.

A still further object is to provide perforated discs for replacing the lens in spectacles.

A still further object is to provide a lensless spectacle having means for producing sharp, clear vision at both close and long ranges.

A still further object of this invention is to provide opaque discs for replacing the lens in spectacles with discs having a series of openings therein diminishing in size from the top to the bottom to produce sharp, clear vision at any range.

These and other objects which will be hereinafter made apparent to those skilled in this particular art are accomplished by means of this invention, one embodiment of which is described in the following specification and illustrated in the accompanying drawings, wherein.

Figure 1:
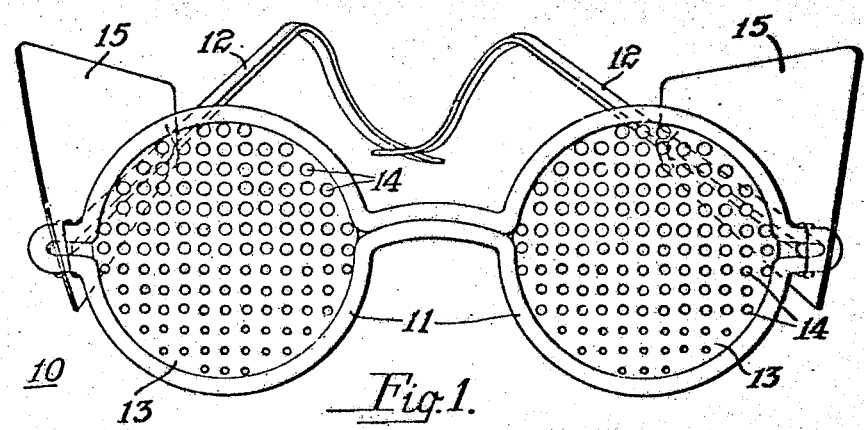
Figure 1 is a perspective view of a pair of spectacles having perforated opaque discs instead of lenses; the openings being graduated, and arranged in the form of rectangular patterns.

It is a well known principle of physics that light passing through a small opening or transparent spot in an opaque surface may, by virtue of its rectilinear propagation, be cause to form sharply defined images upon a suitably placed screen or the like. Also, if the opening in the opaque surface is placed in the focal axis of a lens, the image formed by the lens will be sharpened or more clearly defined, since the aberrations caused by imperfections in the lens will be reduced. This image, however, is less bright than the image produced by the lens alone.

The distance of the screen, upon which apparent sharp focusing of the image is obtained, from the opaque surface, depends and varies indirectly with the diameter of the hole or opening in that surface, and the range in which the screen may be moved forward and backward from the lens without blurring corresponds to the size of the opening in the opaque surface and the distance that surface is from the lens. That is to say, an opaque surface positioned relatively close to the lens and having a very small opening therein produces a wider range of non-blurring focus than does an opaque surface spaced farther from the lens and having a larger opening therein. In the latter case and also when the lens is used by itself a sharper focus is obtained, and the range of non-blurring focus is greatly reduced.

Also, it is a well known fact that when such an opaque surface having a small opening or transparent spot therein is held before the pupil of the eye, substantially the same effects are noted as when it is held before an ordinary lens; and the vision of a person having defective eyes such as myopia where the focal point of the eye is in front of the retina, or hypermetropia where the focus point of the image is behind the retina, is greatly improved or sharpened when looking through a small hole in an opaque surface. This is due to the fact that the focal point in both instances falls within the range of non-blurring focus produced by the opening in the opaque surface.

Likewise, blurring of the vision due to aberration, astigmatism, etc., is greatly reduced and in some cases eliminated by looking through a small aperture.

At the present time, it is the common practice to correct astigmatism, myopia, hypermetropia, and other defects such as changes in the eye structure itself due to infirmities of old age and the like, by placing a lens before each eye of the person having impaired vision so that the images will be focused sharply upon the retina of the eye. In some instances, a single lens before each eye cannot fully rectify the condition of the eye and it is necessary to use double or bifocal lens to secure both reading and distance vision, or to use a separate pair of spectacles for reading and another for distance. In either case, there is a zone of dim vision between where the sharp vision for reading ends and the sharp vision for distance begins.

To overcome this imperfection in the treatment of eyes with lenses, I have designed, what may be termed a "lensless spectacle". That is, I have designed a spectacle in which the lens are replaced with opaque discs having a series of perforations therein through which the image is viewed by the eye. By looking through the openings, the range of non-blurring focus of the eye is increased but the brightness of the image is diminished. Therefore, to secure a disc suitable to give wide visual field and a wide range of sharp near and far vision, and also to secure a bright image, I form a series of graduated and exactly spaced openings in the disc, the size of the openings diminishing from the top to the bottom. The larger openings at the top of the disc admit more light than the smaller openings and therefore give brighter vision and are preferred for distance, while the holes at the bottom thereof being smaller, shut out a portion of the light and are suitable for minute vision. Hence, the wearer by merely lifting his head slightly is able to adjust his range of vision from distance to very close reading or the like, in substantially the same manner as a person wearing the ordinary "bifocal" lens.

Between the brightness of the image and the sharpness or definition of outline thereof, there is a physiological optimum, that is a point where both the outline and the brightness of the image are best, and I have found that the eye under the subconscious will of the wearer quickly learns to seek and find the optimum size holes in the discs.

It is highly important that the openings in the opaque discs be properly spaced apart, to secure the proper vision. If the openings are spaced closer than the diameter of the pupil of the eye, and an object is viewed at a distance less than the eye is able to adjust for, either two or more images will be seen, or the images will appear to overlap and thus appear blurred. If the distance between the openings is too great, a relatively coarser shadow of the network will fall upon the retina of the eye and the continuity of the image comprising the visual field will, consequently, be broken or restricted. I have found that on the average, the best results are obtained by having the openings in the disc spaced about four millimeters apart.

As may be readily inferred from the preceding discussion, the size of the openings in the opaque discs, as well as the spacing thereof, is of the utmost importance in securing good vision. If the opening is beyond a certain size, it ceases to cause an image to be formed on the retina, since it does not sufficiently confine the light beams within the permissible range on the cornea and lens of the eye, and if the opening is below a certain size, it does not permit sufficient light to be transmitted for clear vision. I have found that with ordinary illumination and for minute vision, a sharp, clear image is obtained by using openings of approximately 0.3 mm. in diameter, while for long distance vision, the best results are obtained when openings approximately 1.5 mm. in diameter are provided.

After the size and spacing of the openings has been determined, the next problem is in regard to the arrangement or design of the openings. I have found that the best vision is obtained by forming the openings on the lines of a parallelogram.

The parallelogram may be in the form of a rectangle or any other desired form. When the openings are arranged in lines forming a rectangle good vision is obtained and there is no distortions or irregularity in the image, and there is apparently no break in a line carried through the images from adjacent openings either horizontal or vertical. When the lines of openings forming the parallelogram are not rectangular but are staggered in relation to the vertical axis of the discs, there is some distortion of the image. However, it has been found that in the latter arrangement, there is a greater continuity of the images being viewed than there is in the rectangular arrangement, which counterbalances the distortion caused by the staggered appearance of the openings. Due to the greater continuity, the eye soon becomes accustomed to the slight distortion and the wearer soon loses consciousness of it.

For different purposes or cases, I have found that different forms or combinations of the arrangement of the openings in the disc may be beneficial. A slot may be formed in the center of the disc if desired, or several slots or holes may be provided.

Such an opening or openings may be formed on either the horizontal or vertical axis of the disc or otherwise placed and provide a space or spaces through which the wearer may look for distant vision. When a slot is arranged on the vertical axis of the disc, I prefer to form perforations on each side thereof, of such size that sharp, clear, near vision is obtained when the wearer turns his head or eyes slightly and looks through the openings.

If the slot is to be formed on the horizontal axis of the disc, I prefer to have the openings above the slot, of slightly larger diameter than the openings below the slot. Such an arrangement permits the wearer to have the normal use of his eye when looking through the slot, to secure long distance vision by tilting his head forward so that his eye is directed to look through the larger openings above the slot and to obtain near or close vision by tilting his head back so that his eye looks through the smaller openings in the bottom of the disc.

Another feature of my invention resides in replacing the lens of the spectacles with multiple perforated plates. Each of these plates, which may be either pivoted together at the top or bottom, have a series of spaced openings so formed therein that when in one position, the openings in one plate register with the openings in the other plate, and when one of the plates is shifted or turned about its pivot and moved relative to the other, it serves to regulate the size of the open or uncovered spaces of the openings so that their size may be quickly regulated for all conditions and purposes. When the multiple plates are used, one of them is stationarily secured to the rim of the spectacles, and the other has an arm attached thereto which extends slightly beyond the rim and permits the wearer to readily adjust the size of the openings for any type of desired vision. For example, for great or far distance, the maximum opening is desirable since it transmits more light to the eye, and the wearer may readily secure this maximum size of the opening by moving the arm on the rim of the spectacle so that the openings in the two discs are registering. To secure smaller openings for near vision or to secure the optimum size opening, if the maximum size opening is too large, the wearer merely moves the arm in the proper direction and the desired size of opening is almost instantly obtained.

The openings in each of the multiple plates may be graduated in size with the larger openings at the top and the smaller below, and if pivoted at their lower edges, any adjustment of the movable plate causes the larger openings to be partially closed so that the entire disc is adjusted for close, sharp vision. Also, a combination of uniform large openings may be provided in both discs with one disc provided with another set of openings graduated in size and so spaced that after a closure of the openings controlled by the large openings in the two discs, the graduated openings in the disc provided with two sets of openings are uncovered.

When one of the plates is moved relative to the other to partially close the size of the apertures through which the eye of the wearer is looking, it is apparent that this moving causes the apertures to become elliptical in shape, however, I have found that this is not a serious objection to the multiple plate. Completely uncoverings the apertures in one plate of course provides means for maintaining circular openings.

From the foregoing, it is apparent that with multiple sets of discs or plates, any range of vision is readily obtainable. The discs with multiple sets of holes may be employed and the mounting may be such that sliding or straight-line movement or adjustment is provided.

With any modification of my invention, satisfactory vision is secured at all ranges, the graduated openings, the slot and small openings, and the multiple disc all give substantially the same results as the ordinary "bifocal" lens.

Referring to the drawings in detail, in Fig. 1, I have illustrated a pair of spectacles 10 having a frame 11 and temples 12. Mounted in the frame 11 are opaque discs 13 having a series of openings 14 therein at right angles one to the other, and of such size that an image will be formed upon the retina of the eye of the wearer. I have found that the best results are obtained when the size of the openings in the discs do not exceed the diameter of the pupil of the eye and are large enough to transmit a sufficient amount of light for adequate vision. If the openings are too large, they will not cause an image to be formed on the retina, and if too small, will not admit enough light to adequately view the image.

Figure 2:
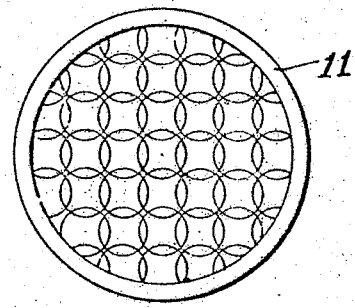
Fig. 2 is a view illustrating the effect on the eye of the wearer of a rectangularly perforated disc having the perforations spaced too close together.
Figure 3:
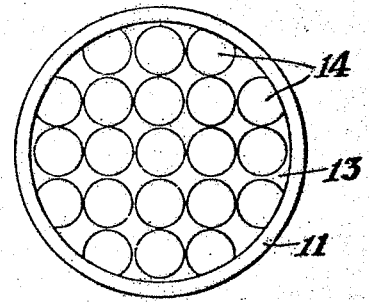
Fig. 3 is a view illustrating the appearance to the eye of the wearer of a disc with the rectangularly arranged openings properly spaced.

To secure good vision these openings 14 must not only be within certain limits in size, but must also be so spaced apart that the appearance of the disc and openings to the eye of the wearer is much like that of a honeycomb (Fig. 3). When the openings are spaced too far apart, a large portion of the retina is unilluminated, large spaces of the disc are seen by the wearer and poor vision is the result. If the openings are spaced too close together the result is in the wearer being conscious of two images of the object or the images overlap and, as illustrated in Fig. 2, the disc itself presents a blurred appearance to the eye of the wearer.

In order to secure good vision for all ranges of vision, the openings 14 are graduated and decrease in size from the top to the bottom of the disc. The large openings at the top of the disc admit more light consequently giving a brighter image and are used for distance while the smaller openings make the image sharper in outline and are to be used for minute or close vision. Hence, it is apparent that the wearer by merely tilting his head slightly has good vision for all distances, and the discs give substantially the same results as a "bifocal" lens.

To enhance visual brightness, shading devices 15 may be secured to each of the temples 12 to reduce the amount of direct light between the eye and the disc. These shading devices diffuse the light and so reduce the reflection into the eye that substantially all light transmitted thereto comes through the opening in the disc.

Figure 4:
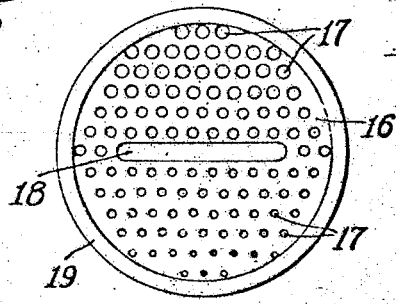
Fig. 4 illustrates another modification of my invention in which the openings in the opaque perforated disc are staggered and a slot is provided for normal vision.

In Fig. 4 I have illustrated a modification of my invention in which the opaque disc 16 having a series of graduated openings 17 and a slot 18 arranged on the horizontal axis of the disc is used to replace the ordinary ground lens used in spectacles. The disc 16 is mounted in a frame 19, a portion of which is shown. The openings 17 in the disc 16, as in the previously described modification, are of such size and are so spaced that to the eye of the wearer a honeycombed appearance is produced. These graduated openings 17 provide for good vision at all ranges of distance and the slot 18 permits the wearer also to have the normal use of his eye.

Figures 5, 6:
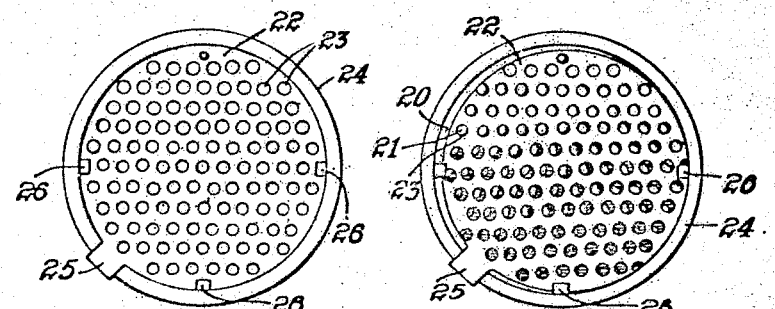
Fig. 5 illustrates another modification of my invention in which multiple opaque, perforated discs pivoted together at the top are used in place of lenses, one of said discs being adapted to be stationarily mounted in the frame of the spectacles.
Fig. 6 illustrates the appearance of the openings in the disc when the movable disc is turned relative to the stationarily mounted disc.
Figure 7:
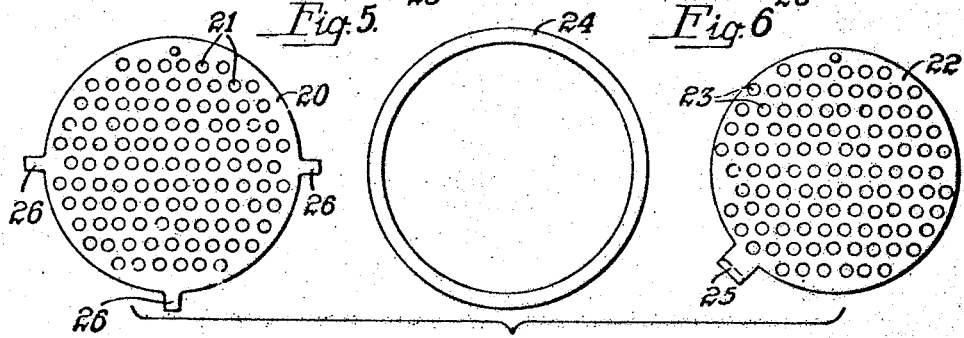
Fig. 7 is an exploded view of the modification shown in Fig. 5.
Figures 8, 9:
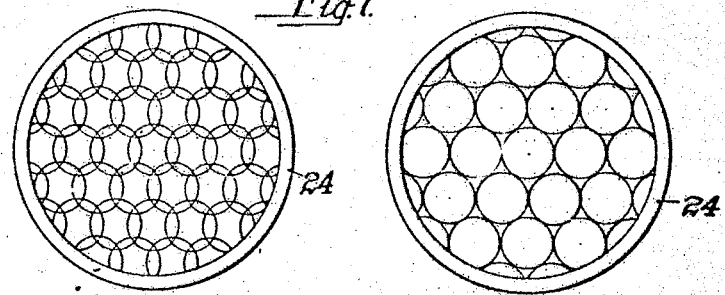
Fig. 8 is a view illustrating the effect on the vision of the wearer of spacing staggered openings in the discs too close together.
Fig. 9 illustrates the effect obtained when the staggered perforations are properly spaced.

Another feature of my invention resides in what may be termed a multiple perforated disc, one of which is stationary and the other movable relative thereto to vary the size of the openings through which the object is viewed so that a clear, sharp image will be formed regardless of the distance of the object from the eye. In Figs. 5, 6, and 7, I have illustrated a multiple disc made in accordance with my invention and comprising an opaque disc 20 having a series of spaced openings 21 therein all of which are of substantially the same size, and an opaque disc 22 pivoted to the disc 20 and having a series of spaced openings 23 therein of substantially the same size as the openings in the disc 20. The openings 21 and 23 in each of the discs 20 and 22, respectively, may be arranged in the form of a rectangle or they may be staggered as shown, and are so spaced that to the eye of the wearer, the disc appears as a honeycomb (Fig. 9).

The disc 20 is stationarily mounted in a frame 24 representing one side of the frame of a pair of spectacles. To permit the disc 22 to be readily turned about its pivot to change the size of the openings through which the eye may be directed, an arm 25 is formed integral with the disc 22 which extends over the frame 24 in position to be readily touched by the person wearing the spectacles. The movement of the disc 22 in either direction relative to the disc 20 is limited by ears 26 formed integral with the disc 20, which are so arranged that when the disc 22 is turned to its full extent in one direction the openings 21 and 23 are in full alinement, and when turned to its full extent in the opposite direction, the openings 23 are moved out of register with the openings 21, whereby the latter are partially closed.

From the foregoing it is apparent that when the openings 21 and 23 in the discs 20 and 22 are in alinement the image will be viewed through the full sized openings, and since these openings are relatively large, they admit sufficient light to give bright vision in viewing distant objects. When the openings are partially closed by turning the disc 22, the size of the object admitted is materially reduced and good, close vision is obtained and since the disc 22 may be readily turned in either direction, it is further apparent that the discs may be almost instantly adjusted by a touch of the finger to provide the optimum size opening best suited depending, of course, on the brightness of illumination and the distance the object is removed from the eye.

Figures 10, 11:
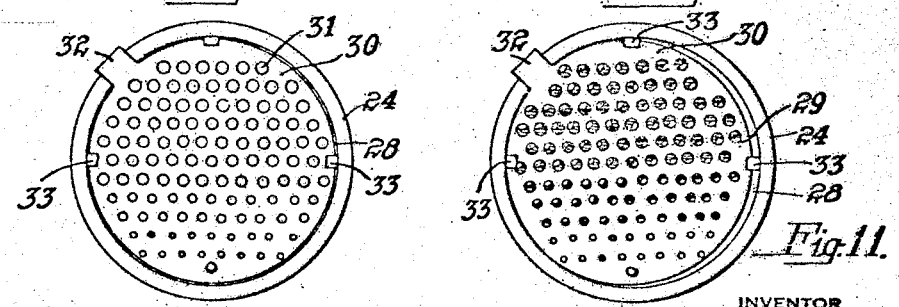
Fig. 10 illustrates another modification of my invention in which multiple, perforated discs having graduated openings are pivoted together at the bottom.
Fig. 11 illustrates the appearance of the openings in the multiple discs shown in Fig. 10, when one is moved relative to the other.

The multiple perforated discs may be pivoted at the bottom as well as at the top, and the openings may be graduated in size. In Figs. 10 and 11, I have illustrated a multiple disc embodying another modification of my invention. In this modification, the frame 24 of the spectacle has an opaque disc 28 stationarily mounted therein which is provided with a series of spaced openings 29. These openings 29 are graduated and are so arranged in the disc that the largest openings are at the top of the disc and the smallest at the bottom thereof. Pivoted to the bottom of the disc 28 is a disc 30 having a series of graduated openings 31 formed therein of substantially the same size as the openings in the disc 28. The openings 31 are so spaced in the disc 30 that when it has been turned to one position, these openings 31 register or are in alinement with the openings 29 in the disc 28. When in this position the wearer may, by tilting his head slightly forward, look through the large openings for distant vision and by tilting his head back, use the small openings for close vision.

By turning the disc 30 about its pivot point, the large openings at the top of the discs will be partially closed or reduced in size so that they are of substantially the same size as the openings in the bottom of the disc, thereby making all the openings in the multiple discs suitable for close range vision.

The disc 30 has an arm 32 extending over the side of frame 24 for readily turning the disc about its pivot point. The turning movement of the discs 30 is limited by ears 33 which are so positioned on the disc 28 that when the disc 30 is moved in one direction the openings in both discs will be in alinement and when turned in the opposite direction, the large openings will be partially closed.

From the foregoing description of my invention, it is readily apparent that I have provided spectacles which give bright, clear, sharp images for all ranges of vision, and that these results, which are substantially the same as those obtained by use of "bifocal lens", are obtained without the aid of any lenses.

If the eyes of the wearer are so defective that sharp images are not formed upon the retina by even the smallest hole admitting adequate light, then simple lenses may be combined with any form of my invention to secure perfect vision for the wearer. Further, it is not necessary that these simple lenses used in combination with the discs be fitted to the eye since the viewing of the object through a small opening is sufficient to give such a wide range of non-blur vision that correction of aberrations and the like is unnecessary.

Further, my invention not only relieves eye strain, but it also affords protection for eyes sensitive to strong light. Therefore, spectacles embodying my invention are especially suitable for sun or other glare protection and may also be used as goggles to protect the eye against furnace or welding glare, heat or foreign bodies, missiles, or the like, and to maintain and provide sharp vision without the use of lenses.

It is to be understood, that while I have described my invention in connection with spectacles for perfecting impaired vision, my invention is not to be limited thereto, but may be readily used with normal eyes when sharp, clear vision is desired, as for example in gun sighting and the like.

While I have illustrated one embodiment of my invention, it is to be understood that certain changes, substitutions and the like may be made therein without departing from the spirit of my invention or the scope of the appended claims.

What I claim as new and desire to secure by Letters Patent is:

1. A device for perfecting impaired vision, comprising an opaque member having a series of graduated openings therein spaced over the entire surface thereof, the larger of said openings being substantially equal in diameter to the diameter of the pupil of the eye of the wearer and gradually decreasing in size from the top to the bottom thereof.

2. A device for perfecting impaired vision comprising an opaque disc having the entire surface provided with a series of graduated openings therein decreasing from about 1.5 mm. at the top to about .3 mm. at the bottom and so spaced apart that to the eye of the wearer the appearance is that of a honeycomb whereby continuity of image is secured.

3. A device for protecting the eye and for securing sharp vision comprising an opaque disc having the entire surface provided with a series of rectangularly arranged, closely spaced circular openings therein, said openings increasing gradually in size from a minute pin hole of substantially .3 mm. in diameter at the bottom to relatively large openings of substantially 1.5 mm. at the top of the disc, whereby the eye may select the optimum size opening for both distant and near vision.

4. A device for perfecting impaired vision comprising a stationary opaque member having its surface provided with perforations substantially 1.5 mm. in diameter, spaced substantially 4 mm. apart and arranged in vertical and horizontal rows, and a second opaque perforated member movable relative to said first mentioned member about a point adjacent the tops of said members, the perforations in the movable member being spaced apart and of the same size as the perforations in the other member to register therewith when in one position and to partially close a portion of those perforations when moved to other positions.

5. A device for perfecting impaired vision comprising a stationary member having the entire surface provided with a series of circular openings therein of substantially the same diameter and arranged in horizontal rows and spaced apart a distance substantially equal to the pupil of the eye, and a movable member having a series of openings therein of the same size and arrangement as the openings in said stationary member, the top of said movable member being pivoted to the top of said stationary member whereby it can be turned in one direction to cause the openings in both members to register and turned in the opposite direction to partially close the openings in the lower part of the stationary member.

6. A device for perfecting impaired vision comprising multiple opaque discs pivoted together at the bottoms thereof, each disc having its entire surface provided with a series of graduated circular openings therein decreasing in size from substantially 1.5 mm. at the top to substantially .3 mm. at the bottom and spaced substantially 4 mm. apart, one of said discs being turnable relative to the other to partially close the larger openings at the top of the discs.

7. A device for perfecting impaired vision comprising an opaque disc having a series of spaced openings therein arranged in horizontal rows and gradually decreasing in size from relatively large openings at the top to relatively small openings at the bottom, the larger openings being substantially equal in diameter to the diameter of the pupil of the eye, said openings being so spaced apart that a honeycomb effect is produced on the eye of the wearer.

8. A device for perfecting impaired vision comprising an opaque disc having the entire surface provided with a series of circular openings decreasing in size from the top to the bottom thereof from approximately 1.5 mm. at the top to approximately .3 mm. at the bottom.

CHARLES C. GUTHRIE.